April 11, 1961   H. L. McQUISTON ET AL   2,978,828
SIGNALLING DEVICE
Filed April 24, 1959

HORACE L. McQUISTON
FRANK E. TAYLOR
INVENTORS

BY *Leech & Radue*
ATTORNEYS

2,978,828
SIGNALLING DEVICE

Horace L. McQuiston, 500 S. Washington St., El Dorado, Kans., and Frank E. Taylor, 1416 S. Wichita St., Wichita, Kans.; Horace Leman McQuiston, executor of said Horace L. McQuiston, deceased Filed Apr. 24, 1959, Ser. No. 808,691

3 Claims. (Cl. 43—17)

This invention relates to a signalling device and more particularly a signal light and buzzer attachment adapted for mounting on a fishing rod to indicate when a fish bites.

It is an object of this invention to provide a signalling device for use on a fishing rod which is adaptable for daytime or nightime use.

It is another object to provide a signal device wherein the fishing line is frictionally held so that a pull on the line will cause a circuit to be closed to actuate the signal producing member.

It is yet another object to provide means for adjusting the amount of pull necessary to close the signal circuit.

It is a still further object to provide a signal device which is compact, durable and economical to manufacture.

This invention will appear more clearly from the following detailed description when taken in conjunction with the accompanying drawing, showing by way of example preferred embodiments, and wherein.

Figure 2:
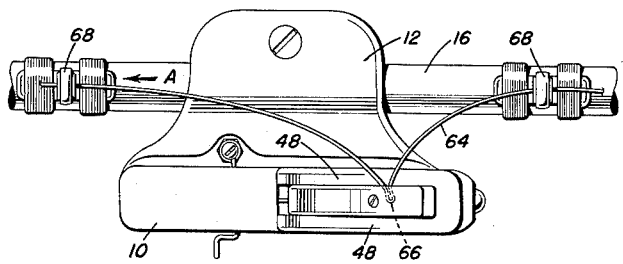
Fig. 2 is a top plan view of the signal device secured to a fishing rod.
Figure 1:
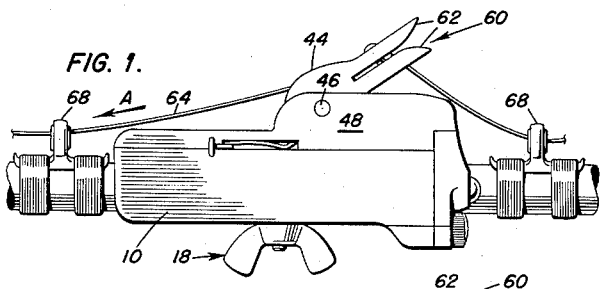
Fig. 1 is a side elevational view of the signal device mounted on a fishing rod.
Figure 3:
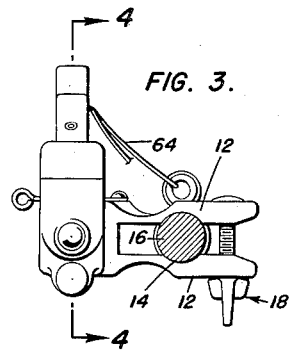
Fig. 3 is an end elevational view with the signal device mounted on a fishing rod and looking toward the forward end of the fishing rod.

As illustrated in Figs. 1–3, the signal device comprises a housing 10 with a pair of flanges 12—12 extending outwardly from one side thereof. The confronting faces of these flanges have concave portions 14 adapted to engage a fishing rod 16. A bolt and wing nut assembly 18 is used to firmly clamp the flanges in engagement with the rod.

Figure 4:
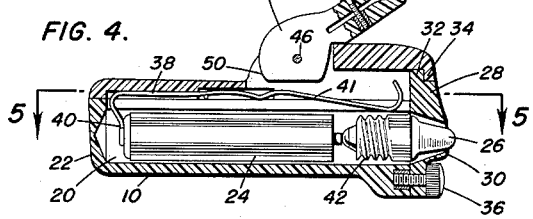
Fig. 4 is a cross sectional view taken along line 4—4 of Fig. 3 showing the switch details.
Figure 5:
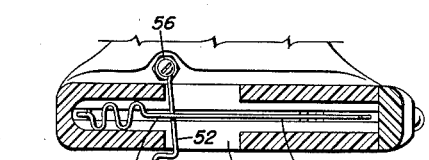
Fig. 5 is a cross sectional view taken along line 5—5 of Fig. 4 showing further details of the switch arrangement.

Referring to Figs. 4 and 5, the housing 10 has a hollow bore 20 extending throughout most of the length of the housing, the rearward end being closed by rear wall portion 22. A conventional small cylindrical battery 24 fits within the bore after which a bulb 26 is positioned within the bore and in contact with the forward end of the battery. The battery and bulb are retained in the bore by means of a cap 28 having a tapered aperture 30 into which a portion of the bulb extends. As indicated, the cap has an offset portion 32 which fits behind shoulder 34 of the housing 10, the cap being held in place by means of screw 36 in the lower portion of the cap.

In order to complete the electrical circuit between the battery and the bulb, a flexible contact spring 38 is positioned in the upper portion of the housing above the battery and bulb. The rearward portion of the contact spring is relatively fixed with respect to the housing and has a downwardly extending contact element 40 which contacts the base of the battery 24. Obviously this contact element 40 is of spring-like nature to aid in the assembly of the battery and bulb within the housing. The forward portion 41 of the contact spring is flexible so that its end portion may be forced into engagement with the metal shell 42 of the bulb 26 to complete the electrical circuit to light the bulb.

The contact spring is depressed by means of a switch lever 44 pivotably mounted on pin 46 carried by parallel upstanding flanges 48. The switch lever 44 has a lower cam portion 50 which engages the forward portion 41 of the contact spring to depress same.

In order to vary the amount of force needed to depress the forward portion of the contact spring 38 an adjusting lever 52 is provided. As best shown in Fig. 5 the adjusting lever 52 is pivotally mounted in horizontal slot 54 by pivot pin 56. It should be noted that the lever passes beneath the contact spring 38. The adjusting lever 52 has an end handle 58 by which the lever may be gripped in operating it.

The principle involved in the force varying means is quite simple. Swinging of the adjusting lever 52 about pivot 56 changes the fulcrum about which the forward portion of the contact spring bends thus proportionably varying the force necessary to depress the contact spring.

The switch lever 44 has a bifurcated outer arm portion 60 such that the spacing between the bifurcated portions 62—62 may be controlled by means of a screw 61 threaded through both bifurcations 62—62. This makes it possible to grip fishing lines of various sizes therebetween. As indicated in Figs. 1–3 the fishing line 64 is formed with a loop portion 66 which is frictionally held between bifurcations 62—62 of the switching lever 44.

It is believed that the use and operation of this signal device is obvious from the foregoing description, however, a brief description follows.

With the battery and bulb assembled in the device, it is secured to a fishing rod 14 by means of flanges 12 held by bolt and nut assembly 18. A fishing line 64 running between eyelets 68—68 is formed in a loop 66 which is placed between and frictionally held by bifurcations 62 of the switch lever 44. After this the desired force setting is made by appropriately adjusting lever 52 and the device is now ready for use. Upon a pull being exerted upon the line 64 in the direction indicated by arrow A in Figs. 1 and 2 the switch lever 44 will pivot, the cam portion 50 will engage and depress the forward portion of contact spring 38 into contact with the metal shell 42 of the bulb 26 to complete the electrical circuit and energize the bulb.

Normally, a fish bite will result in a series of pulls which will cause a blinking of the light. In the event that there is a very hard jerk or a very hard steady pull the switch lever 44 will be swung forwardly beyond dead center so that the light will remain on.

Figure 6:
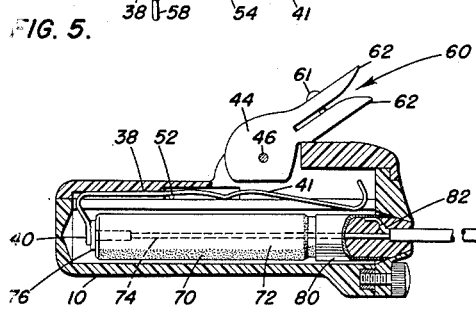
Fig. 6 is a view partly in section showing the signal device embodying a buzzer.
Figure 6:
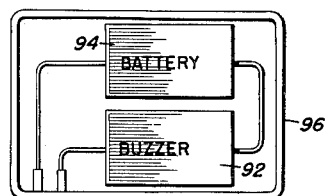

The embodiment disclosed in Fig. 6 provides a buzzer as the signalling means. This embodiment has the same elements as the embodiment illustrated in Figs. 1–5 except that in place of battery 24 and bulb 26 there is substituted a cylindrical contact plug 70. The plug 70 comprises an insulating cylindrical shell 72 carrying a conductor 74 extending longitudinally therethrough and terminating in a contact 76 which engages the lower contact end 40 of contact spring 38. This conductor 74 extends out through the forward end of the plug 70. The forward end portion of the plug is covered by a metal shell 80 from which extends a conductor 82 which also passes out the forward end of plug 70. These two conductors 72 and 82 terminate in plugs 84 and 86 which fit into jacks 88 and 90 connected to conductors serially connecting buzzer 92 and battery 94. The buzzer and battery unit may be carried within a suitable receptacle 96.

The operation of this embodiment is the same as the previous one, the forward portion of contact spring 38 is depressed to contact shell 80 to complete the electrical circuit to energize the buzzer 92.

It will be understood that numerous modifications may be made without departing from this invention as covered by the following claims.

What we claim as novel and desire to secure by Letters Patent of the United States is:

1. A signal device adapted for mounting on a fishing rod equipped with the conventional fishing line, said device comprising a housing, means extending from the housing and adapted to secure the housing to a fishing rod, said housing having a hollow bore, a flexible contact spring longitudinally positioned in the housing, the rearward portion of the spring being relatively fixed with respect to the housing, the forward end of the contact spring being movable, a switch lever pivotably mounted on the housing, a cam portion on the lever for engaging and depressing the forward end portion of the contact spring, a lever pivotally mounted on the housing and extending transversely and beneath the depressable portion of the contact spring to act as a fulcrum for said spring so that by varying the position of the lever along the length of the depressable spring portion a varying force will be required to depress said spring portion, power and signalling means engaging and electrically connected to the rearward end of the contact spring and the forward end of the contact spring when same is depressed to complete the circuit, and means on the switch lever adapted to frictionally hold the fishing line so that a pull on the line will pivot the lever causing said cam portion to depress the forward end of the contact spring to complete the electrical circuit and actuate the signal means.

2. A signal device adapted for mounting on a fishing rod equipped with the conventional fishing line, said device comprising a housing, means extending from the housing and adapted to secure the housing to the fishing rod, said housing having a hollow bore with the rearward end closed and the forward end open, a cylindrical battery positioned in the bore, a light bulb positioned in the bore forwardly of and in contact with the forward end of the battery, a cap closing the forward end of the casing bore, said cap having a tapered aperture into which a portion of the bulb fits, a contact spring positioned within the housing and above the battery and bulb, the rear portion of the contact spring engaging and making electrical contact with the rearward end of the battery, the forward end of the contact spring being depressable into engagement with the bulb to complete the electrical circuit to excite the bulb, a switch lever pivotally mounted on the housing, a cam portion on the lever for engaging and depressing the forward portion of the contact spring, a lever pivotally mounted on the housing and extending transversely and beneath the depressable portion of the contact spring to act as a fulcrum for said spring so that by varying the position of the lever along the length of the depressable spring portion a varying force will be required to depress said spring portion, frictional means on the switch lever adapted to engage and hold the fishing line so that a pull on the line will cause the switch lever to pivot and depress the forward portion of the contact spring to close the electrical circuit and energize the bulb.

3. A signal device adapted for mounting on a fishing rod equipped with the conventional fishing line, said device comprising a housing, means extending from the housing and adapted to secure the housing to a fishing rod, said housing having a hollow bore, a flexible contact spring longitudinally positioned in the housing, the rearward portion of the spring being relatively fixed with respect to the housing, the forward end of the contact spring being movable, a switch lever pivotably mounted on the housing, a cam portion on the lever for engaging and depressing the forward end portion of the contact spring, a lever pivotally mounted on the housing and extending transversely and beneath the depressable portion of the contact spring to act as a fulcrum for said spring so that by varying the position of the lever along the length of the depressable spring portion a varying force will be required to depress said spring portion, a contact plug fitting within the housing bore, said contact plug comprising a cylindrical insulated shell, a first conductor extending longitudinally through said shell and terminating in a contact at the rear end of the shell, the rearward portion of the contact spring engaging the contact at the rear end of the shell, a conducting material covering a portion of the forward end of the plug shell, said covering being positioned so that the forward portion of the contact spring may contact same, a second conductor extending from said covering, both first and second conductors passing out through the forward end of the plug, a battery and a buzzer serially connected with said first and second conductors so that when the forward portion of the contact spring is depressed into contact with the covering on the forward end of the plug shell the circuit is completed to energize the buzzer.

References Cited in the file of this patent

UNITED STATES PATENTS

| 1,707,901 | Bubb et al. | Apr. 2, 1929 |
| 2,680,842 | Opphile | June 8, 1954 |
| 2,762,907 | Schwartz | Sept. 11, 1956 |